(12) United States Patent
Cheatle et al.

(10) Patent No.: US 8,817,126 B2
(45) Date of Patent: Aug. 26, 2014

(54) COMPILATION OF IMAGES

(75) Inventors: Stephen Philip Cheatle, Bristol (GB); David Neil Slatter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 13/380,030

(22) PCT Filed: Jun. 24, 2009

(86) PCT No.: PCT/US2009/048403
§ 371 (c)(1),
(2), (4) Date: Dec. 21, 2011

(87) PCT Pub. No.: WO2010/151257
PCT Pub. Date: Dec. 29, 2010

(65) Prior Publication Data
US 2012/0098994 A1    Apr. 26, 2012

(51) Int. Cl.
*H04N 5/228* (2006.01)
*H04N 5/76* (2006.01)
*G06K 9/36* (2006.01)
*H04N 5/77* (2006.01)
*G06K 9/20* (2006.01)

(52) U.S. Cl.
CPC ........ *H04N 5/772* (2013.01); *G06K 2009/2045* (2013.01)
USPC .................. 348/222.1; 348/231.2; 348/231.3; 382/284

(58) Field of Classification Search
CPC ....................... H04N 5/772; G05K 2009/2045
USPC .......... 348/231.2, 231.3, 239, 222.1; 382/284
See application file for complete search history.

(56) References Cited

U.S. PATENT DOCUMENTS

| | | | |
|---|---|---|---|
| 7,203,380 B2* | 4/2007 | Chiu et al. | 382/284 |
| 2004/0054659 A1 | 3/2004 | McIntyre | |
| 2004/0120009 A1* | 6/2004 | White et al. | 358/1.18 |
| 2005/0168779 A1 | 8/2005 | Tsue et al. | |
| 2006/0041564 A1 | 2/2006 | Jain et al. | |
| 2006/0279555 A1 | 12/2006 | Ono | |
| 2007/0064121 A1 | 3/2007 | Issa et al. | |
| 2008/0050039 A1* | 2/2008 | Jin | 382/284 |
| 2008/0123993 A1* | 5/2008 | Widdowson | 382/284 |
| 2009/0116752 A1 | 5/2009 | Isomura et al. | |
| 2010/0066758 A1* | 3/2010 | Mondry et al. | 345/619 |

FOREIGN PATENT DOCUMENTS

| | | |
|---|---|---|
| CN | 10133152 | 12/2008 |
| JP | 2008-217479 | 9/2008 |

* cited by examiner

*Primary Examiner* — Twyler Haskins
*Assistant Examiner* — Peter Chon

(57) ABSTRACT

A system for arranging a number of images into a compilation of images a metadata derivation unit (230) configured to derive metadata from the images based on the content of the images, and an image arranging unit (240) configured to arrange the images into a compilation of images based on the metadata derived from the images. A method for arranging a number of images into a compilation of images is also provided.

7 Claims, 4 Drawing Sheets

COMPILATION OF IMAGES

BACKGROUND

With the advent of the digital camera, professional and lay photographers have been able to more easily and conveniently upload, store, edit, and enhance theft digital images. These digital cameras allow a photographer to send digital images captured by a digital camera via a data transfer means such as by direct data transfer (e.g. memory-to-memory transfer), email, and the internet. Additionally, a photographer may order prints by sending digital images captured by a digital camera to a retailer or vendor, who then uploads the digital images, prints the digital images, and sends the prints to the photographer.

A photographer may wish to arrange his or her digital images in a photo album or other compilation of a number of images. Such a compilation of images may serve several functions or have advantages over a single image print. One advantage to creating a compilation of images is that an arrangement or layout of images in a compilation may be aesthetically appealing. Another advantage to creating a compilation of images is that a viewer may easily view several images of any number of subjects, and appreciate the compilation of the individual images as a whole as well as the individual images themselves. These compilations of images may be presented in tangible form as in the case of a photo album, or in an intangible form through the use of computer software or websites.

Presently, computing devices such as personal computers, and associated software can be utilized to create such albums or compilations. However, present computing devices, software, and methods of creating image albums can be inconvenient and limit a photographer's artistic freedom in designing various aspects of the compilation. Further, these systems do not allow a user to select, edit, and arrange images in an album or other compilation while still controlling specific design aspects which influence the overall compilation. In other words, none of these systems and methods provide for a means to optimize an entire album or other compilation of images using multiple levels of design techniques. For example, present systems and methods may employ a library of templates or layouts that a photographer may use to create a compilation of images. These templates may allow for automatic or manual placement of images into the various "holes" or image placement regions in the template. In some systems, the templates are constructed for each set of digital images according to theft aspect ratios and user preference for the image display size. However, none of these systems provide for a means to automatically or manually arrange images in a compilation based on the content or subject matter of the images.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present application discloses a number of illustrative systems and methods for arranging a number of images in a compilation based on the content or subject matter of the images. More specifically, the present application discloses illustrative systems and methods for arranging a number of images into a collage, mosaic, or compilation based on a number of factors. These factors may include, for example, colors present in the images, the overall complexity of the images, the number of subjects within the images, or the layout of the subjects in the images. Moreover, illustrative systems and methods may apply image analysis techniques such as color segmentation, face detection, and face feature detection in deriving metadata for use in creating an aesthetically appealing compilation of images.

As used in the present specification and in the appended claims, the term "compilation" is meant to be understood broadly as any arrangement of a number of images. Further, as used in the present specification and in the appended claims, the term "metadata" is meant to be understood broadly as any definitional data that provides information about or documentation of other data managed within an application or environment. Still further, as used in the present specification and in the appended claims, the term "image" is meant to be understood broadly as any tangible or intangible representation of a subject including, but not exhaustive of, a person or persons, animals, places, events (e.g. weddings), or things.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Illustrative Structure

Figure 1:
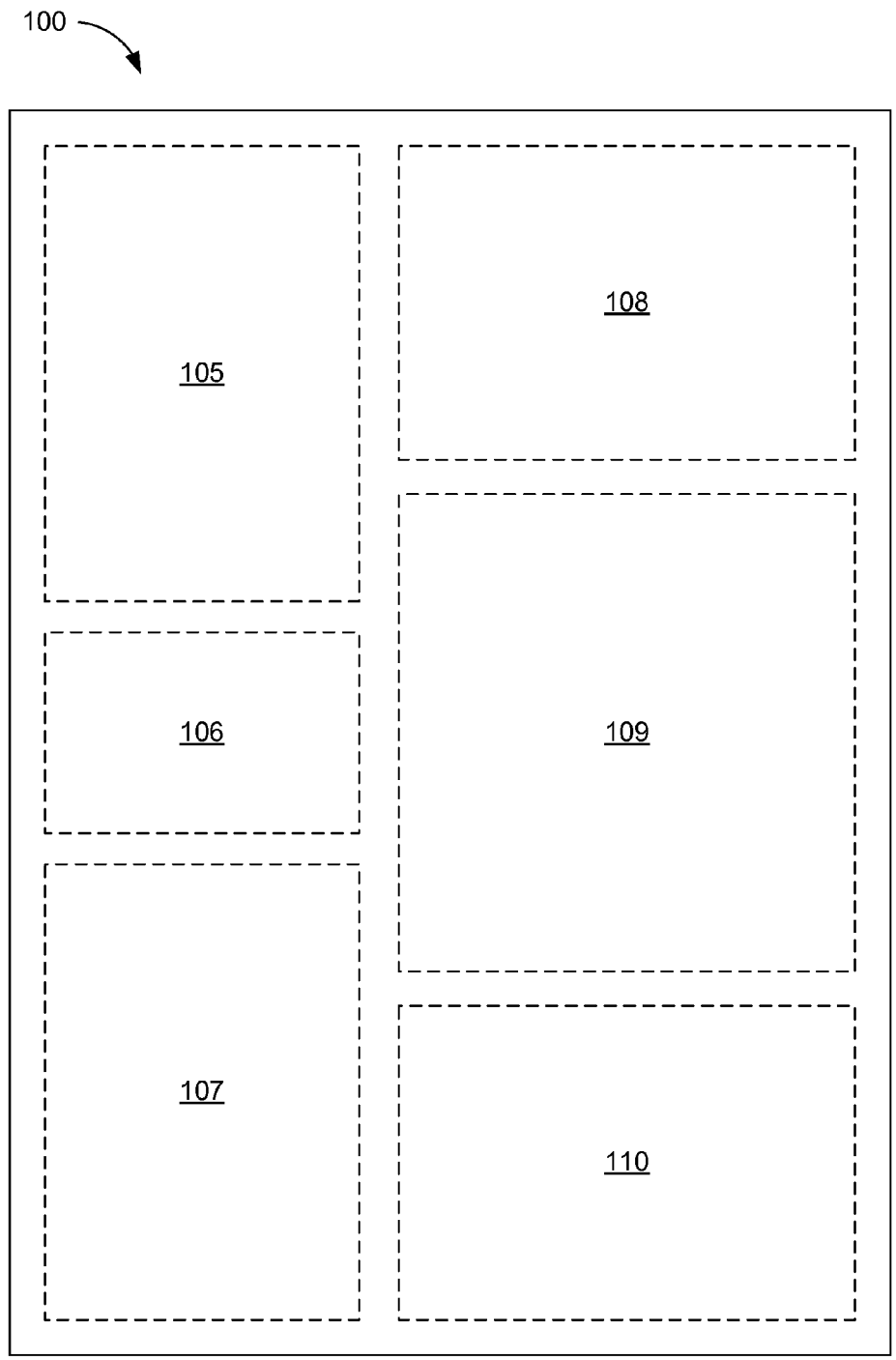
FIG. 1 is a block diagram of an illustrative compilation template, according to one embodiment of principles described herein.

FIG. 1 is a block diagram illustrating a compilation template (100), according to an embodiment of the present illustrative system and method. In FIG. 1, a compilation template may comprise a number of image placement regions (105 through 110) in which a number of digital images may be placed. The compilation template (100) may comprise an infinite number of layouts and may include any number of image placement regions (105 through 110)

Further, the compilation template (100) may allow for manual or automatic placement of the digital images in the placement regions (105 through 110). In one illustrative embodiment, the present system and method may allow for a user to manually place the digital images in the placement regions (105 through 110) after providing hints, advice, recommendations, or other instruction regarding how to layout the digital images within the compilation template (100). In another illustrative embodiment, the present system and method may automatically place the digital images in the placement regions (105 through 110) for the user.

The compilation template (100) of FIG. 1 is given as an example only. According to one illustrative embodiment of the present system and method, the arrangement of images within the compilation template (100) may be dependent on the content and/or subject matter of the images to be incorporated into the compilation template (100). The above-mentioned system and method of determining the placement of the digital images within the compilation template (100) will now be described in further detail below.

According to one illustrative embodiment, the template does not have a static format. Rather, the template is altered based on a variety of factors, including but not limited to, the number of pictures, the content of the pictures, the size of the page, the number of pages, groupings of similar pictures, and other factors. Thus, the placement of the digital images is not constrained by a fixed number of "holes" in a template, but can be dynamically placed for optimum aesthetic results.

Figure 2:
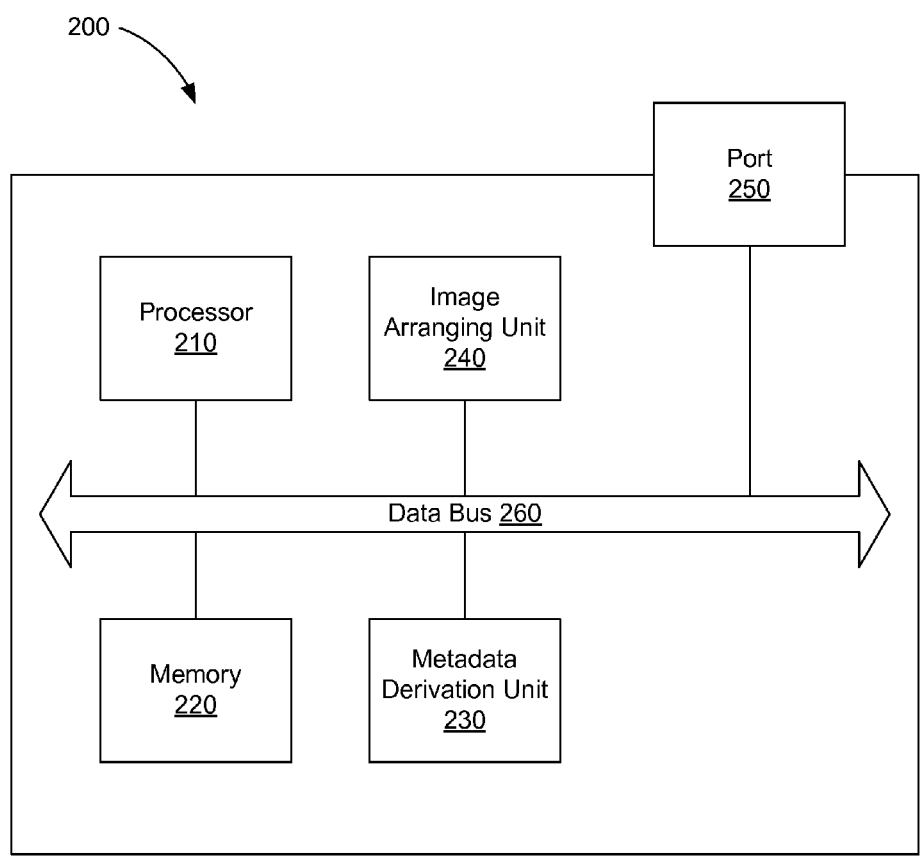
FIG. 2 is a block diagram of an illustrative computing device for arranging a number of images within a compilation template, according to one embodiment of principles described herein.

FIG. 2 is a block diagram illustrating the principal internal components of a computing device (200) for arranging a number of images within a compilation template (FIG. 1, 100), according to an embodiment of the present illustrative system and method. The computing device (200) illustrated in FIG. 2 may be any electronic device configured to process and store data including, but not limited to, a workstation, personal computer, a laptop, a personal digital assistant (FDA), or any other processor containing device. The various components of the computing device (200) are preferably electrically coupled via a data bus (260) or other means.

As shown in FIG. 2, the computing device (200) includes a so processor (210). The processor (210) controls the operation of the computing device (200), including a metadata derivation unit (230). The metadata derivation unit (230) may exist in hardware, as firmware, as software, or as combinations thereof. Further, the metadata derivation unit (230) may exist external to the computing device (200). Still further, the metadata derivation unit (230) may be embodied on a server accessible via the internet, wherein a website (e.g. Snapfish® by Hewlett-Packard, boated at www2.snapfish.com) may provide services connected to and in association with the metadata derivation unit (230). The metadata derivation unit (230) is configured to derive metadata from digital images so that the derived metadata may be utilized in the arrangement of the images in a compilation template (FIG. 1, 100).

Memory (220) is used to store data representative of the digital images, metadata derived from the digital images, and any other data necessary for the function and use of the computing device (200) including, but not limited to, software including and operating system or other software configured to run various programs on the computing device (200). The memory (220) may include a combination of non-volatile memory, e.g. read-only memory (ROM), and volatile memory, e.g. Random Access Memory (RAM).

The computing device (200) may also contain an image arranging unit (240) for creating a composition of images based on the metadata derived by the metadata derivation unit (230). The image arranging unit (240) may exist in hardware, as firmware, as software, or as combinations thereof. Further, the image arranging unit (240) may exist external to the computing device (200). Still further, the image arranging unit (240) may be embodied on a server accessible via the internet, wherein a website (e.g. Snapfish®) may provide services connected to and in association with the image arranging unit (240).

Finally, a number of ports (250) may be provided for importing digital images or other data to the memory (220) of the computing device (200), and outputting data that is representative of a finished composition of images, as will be discussed in more detail below. The ports (250) may be serial or parallel ports including, but not limited to, a USB port, and an IEEE-1394 port. In one illustrative embodiment, the computing device (200) may be connected to a network of computers to allow for data to be transferred to and from the various connected computers. Further, the computing device (200) may be connected to a number of printers to allow for the printing of images on a medium such as paper. Finally, the computing device (200) may be connected to a network (including the Internet) to allow for a user to upload and/or download image data to or from a webpage, store data on the webpage, edit images, and/or enhance digital images on the webpage. According to one illustrative embodiment, the computing device (200) is remote from the user and may comprise a web server running a digital image layout application. The user's images can be stored on the web server or other location. The user can then access the images and digital image layout application through the website. After using the digital image layout application to create a desired pages, album, or montage, the pages can be ordered, printed, or shared using an interface within the webpage.

Illustrative Implementation and Operation

Professional designers take several factors into consideration when arranging images in any kind of compilation. A designer may consider, for example, colors, intensities, and/or textures existent in the images, complexity of the images, the number of persons or objects in the images, angles between persons and/or objects in the images, direction of persons or objects within the images, the minimum and maximum physical area to be occupied by the images (measured in square units like, for example, in$^2$), a minimum and maximum fraction of a page or album that an image should occupy, relative position of the images on a page or album, alignment of the images, and combinations thereof. Further, a designer may consider the above factors individually and as a whole.

Figure 3:
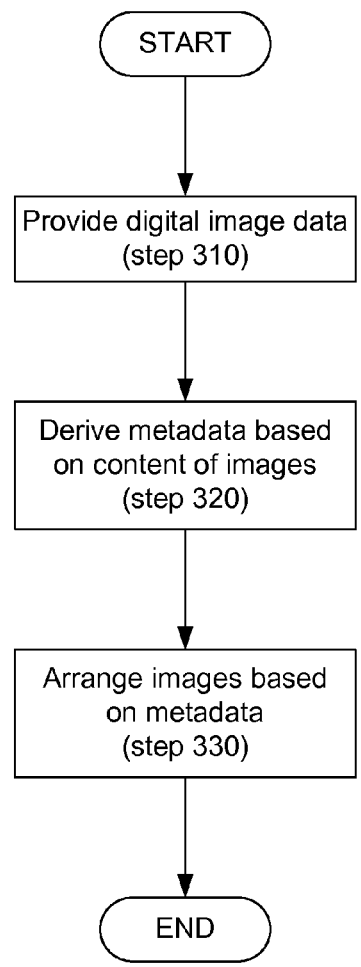
FIG. 3 is a flow chart of an illustrative method of arranging a number of images within a compilation template, according to one embodiment of principles described herein.

Thus, the content and/or subject matter of the various images may be utilized in arranging the various images within the placement regions (FIG. 1, 105 through 110) of the compilation template (FIG. 1, 100). FIG. 3 is a flow chart illustrating a method of arranging a number of images within a compilation template, according to an embodiment of the present illustrative system and method. As shown in FIG. 3, the method starts with the user downloading, or otherwise providing digital image data to the computing device (FIG. 2, 200) for storage in memory (FIG. 2, 220) (step 310). Once the image data is stored in the memory (FIG. 2, 220), the processor (FIG. 2, 210) of the computing device (FIG. 2, 200) then executes a command to the metadata derivation unit (FIG. 2, 230) to derive metadata based on the content of the digital images (step 320). As discussed above, the metadata may then be stored in the memory (FIG. 2, 220) of the computing device (FIG. 2, 200).

Next, the processor (FIG. 2, 210) then executes a command to the image arranging unit (240) to arrange the number of images within a compilation template based on the metadata derived from the images (step 330). Thus, the user is left with a compilation of images that are arranged in a manner so as to reflect how a professional designer may arrange the images.

Figure 4:
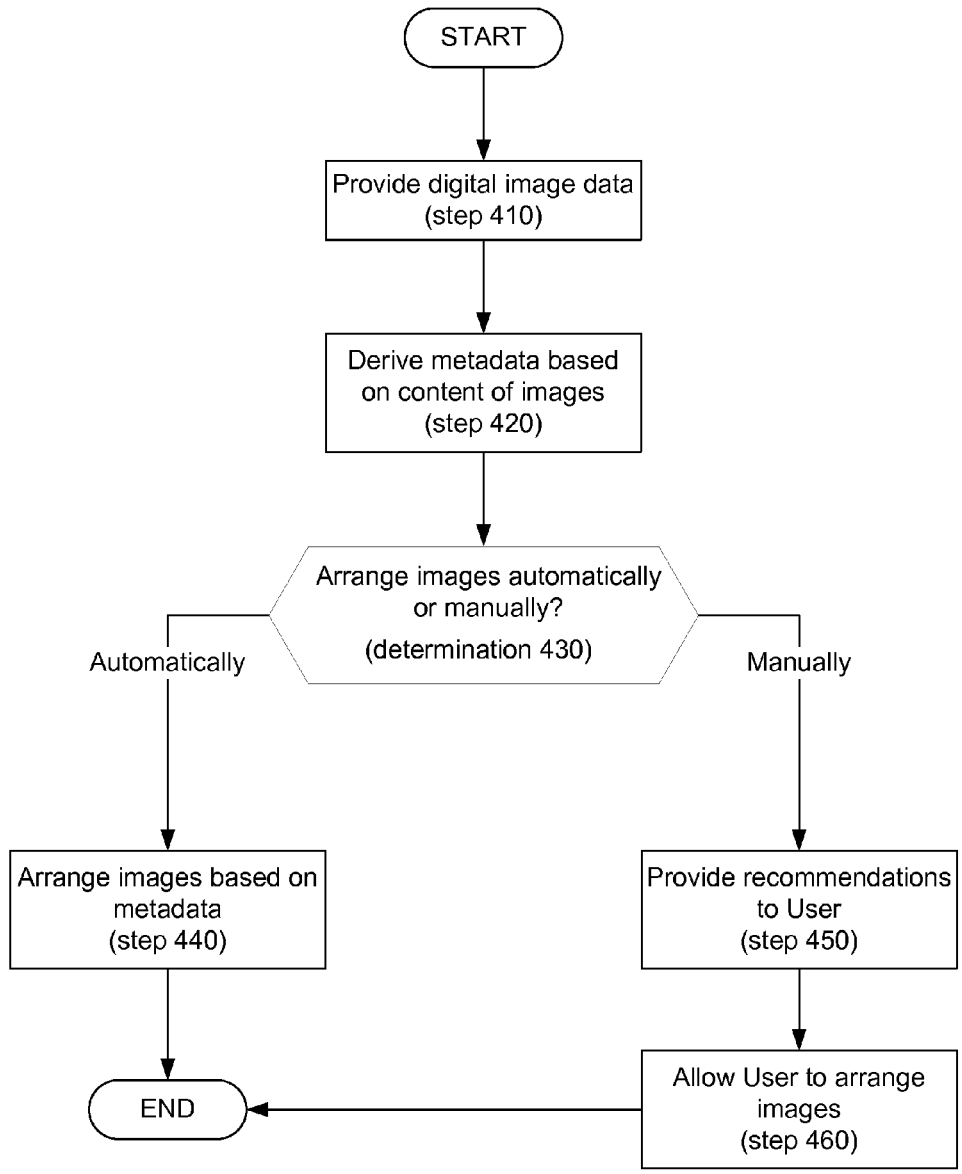
FIG. 4 is a flow chart of an illustrative method of arranging a number of images within a compilation template, according to one embodiment of principles described herein.

With reference now to FIG. 4, FIG. 4 is a flow chart illustrating a method of arranging a number of images within a compilation template, according to another embodiment of the present illustrative system and method. As similarly discussed above, the user downloads, or otherwise provides a digital image data to the computing device (FIG. 2, 200) for storage in memory (FIG. 2, 220) (step 410); the digital image data representative of a number of digital images. Once the image data is stored in the memory (FIG. 2, 220), the processor (FIG. 2, 210) of the computing device (FIG. 2, 200) then executes a command to the metadata derivation unit (FIG. 2, 230) to derive metadata based on the content of the digital images (step 420). As discussed above, the metadata may then be stored in the memory (FIG. 2, 220) of the computing device (FIG. 2, 200).

Next, in one illustrative embodiment, the user may be asked whether to proceed with an automatic arrangement of the images within the compilation template (FIG. 1, 100), or if the user wishes to manually arrange the images within the compilation template (FIG. 1, 100) (step 430). If the user chooses to have the images automatically arranged within the compilation template (FIG. 1, 100), then the system automatically arranges the number of images within a compilation template based on the metadata derived from the images (step 440).

In another illustrative embodiment, the user may be prompted to set user preferences with regard to how the image arranging unit (FIG. 2, 240) automatically arranges the images within a compilation template (FIG. 1, 100). The user preferences may include preferences regarding the various above-identified factors for the image arranging unit (FIG. 2, 240) to consider when arranging the images. These factors will be discussed in more detail below. Still further, the user preferences may be determined at any time before the arrangement of the images within the compilation template (FIG. 1, 100). Even still further, in order to more conveniently arrange the images within the so compilation template (FIG. 1, 100), default preferences may be applied without requesting such preferences from a user.

However, if the user wishes to manually arrange the images within the compilation template (FIG. 1, 100), then the system provides the user with recommendations as to how the user may wish to arrange the images within the compilation template (FIG. 1, 100) (step 450). This provides the user with the requisite artistic freedom in arranging the images, while still providing direction as to how to best arrange the images. As discussed above, the system may provide hints, advice, recommendations, or other instruction to the user regarding how to arrange the digital images within the compilation template (FIG. 1, 100). The user is then allowed to arrange the images as he or she desires (step 460), and may even disregard the recommendations given by the system. Further, the user may be prompted to set user preferences with regard to what recommendations the image arranging unit (FIG. 2, 240) provides as the user manually arranges the images within a compilation template (FIG. 1, 100). The user preferences may include preferences regarding the various above-identified factors for the image arranging unit (FIG. 2, 240) to consider when providing the recommendations. Still further, the user preferences may be determined at any time before the image arranging unit (FIG. 2, 240) provides recommendations or before arrangement of the images within the compilation template (FIG. 1, 100). Even still further, in order to more conveniently arrange the images within the compilation template (FIG. 1, 100), default preferences may be applied without requesting such preferences from a user.

In one illustrative embodiment, in order to achieve automatic placement of the images in the compilation template (FIG. 1, 100), or to provide instructions to a user on the placement of the images in the compilation template (FIG. 1, 100), metadata may be derived from the various digital images. The images may then be arranged according to the metadata derived from the digital images. The present illustrative system and method may be utilized in creating an arrangement of images within a compilation template (FIG. 1, 100) based on the above-identified factors. However, application of these factors may vary among different users depending on the desired overall design and artistic expression among the different users. Thus, as discussed above, in one illustrative embodiment, a user may be able to define how the metadata is applied within the compilation template (FIG. 1, 100), thus giving a user artistic freedom in interpreting how the factors of each digital image should be applied within the compilation of images.

Metadata derived from the digital images may include any of the above-mentioned factors. In one illustrative embodiment, metadata regarding, for example, the number of people in the image, the size of one or more faces within the image, and the complexity of the image (e.g. derived from segmentation techniques as discussed below), may be utilized in determining the minimum and maximum physical area that the image may occupy within the compilation template (FIG. 1, 100). As discussed above, the physical area that the image may occupy may be given in square units of measurement; for example, square inches ($in^2$).

In another illustrative embodiment, the complexity of the image may be utilized in determining the minimum and maximum fraction of the compilation template (FIG. 1, 100) that the image may occupy with respect to other images within the compilation template (FIG. 1, 100). For example, a strong, simple subject may be aesthetically pleasing and work well within the compilation by occupying as little as 2% of the total area of the compilation template (FIG. 1, 100). A complex, detailed image, on the other hand, may demand at least 50% of the compilation template (FIG. 1, 100) with respect to the other images within the compilation template (FIG. 1, 100).

In still another illustrative embodiment, various factors may determine the relative position of each image within the compilation template (FIG. 1, 100). For example, one or more colors within the image may determine the relative position of an image within the compilation template (FIG. 1, 100). In one illustrative embodiment, images containing lighter colors may be located at the top of the compilation template (FIG. 1, 100), whereas images containing darker colors may be located at the bottom of the compilation template (FIG. 1, 100). Semantic segmentation into, for example, "sky" and "grass" may also be used to bias a purely color based result in determining the relative position of an image within the compilation template (FIG. 1, 100).

In still another illustrative embodiment, facial feature analysis techniques may determine the relative position of each image within the compilation template (FIG. 1, 100). Which way a face within the image is looking (which cheek is larger) may be helpful in positioning an image in an aesthetically pleasing position within the compilation template (FIG. 1, 100).

In still another illustrative embodiment, a gaze direction may be utilized to determine the relative position of each image within the compilation template (FIG. 1, 100). For example, the apparent gaze direction of an image may be any number of objects that draw a viewer's eye in a certain direction. In one illustrative embodiment, the images may be positioned such that their individual gaze directions cause a viewer to look towards, for example, another main image or subject within the compilation template (FIG. 1, 100), or towards the center of the compilation template (FIG. 1, 100). This eye-drawing effect causes the viewer to appreciate both the individual images and the synergy of the compilation as a whole.

With regard to the gaze direction factor, if an image contains a number of faces, the present system may be configured to form a combined position measure based on a weighted combination of the strengths of the individual face directionalities and the relative sizes of the individual faces. Within a given image, any number of objects may provide a gaze direction such as the full length of people within the image when no face is detectable, people who are pointing within the image, animal faces, vehicles, and directional signs. Further, in one embodiment, images that contain strong directional lines, such as diagonals, may be positioned such that the lines lead into the compilation template (FIG. 1, 100).

Finally, in still another illustrative embodiment, metadata regarding, for example, dominant horizontal and/or vertical lines within an image, high contrast vertical edges of objects within an image (e.g. edges of buildings), and the eye-line of large faces within an image, may be utilized in determining the alignment of the images within the compilation template (FIG. 1, 100). In one illustrative embodiment, any key position within an image which may be aligned with other images may be used to align images within the compilation template (FIG. 1, 100).

The metadata may be derived by applying any number of image analysis techniques. In one illustrative embodiment, the metadata may be derived via an image segmentation technique wherein every pixel or group of pixels in a digital image is assigned one or more labels such that pixels with the same label share certain visual characteristics such as color, intensity, and/or texture. The result of image segmentation is a set of segments that collectively cover the entire digital image.

Each of the pixels in a region of the digital image are similar with respect to some characteristic or computed property, such as the above-mentioned characteristics of color, intensity, and/or texture. Adjacent regions are significantly different with respect to the same characteristic or characteristics. Based on the image segmentation metadata, the system may then arrange the digital images, or a user may be given instructions as to how to best arrange the digital images in the compilation template (FIG. 1, 100).

In another illustrative embodiment, the metadata may be derived via a face detection technique. In a face detection technique, face detection software may locate faces of subjects within an image. The face so detection software may be configured to detect both profile and frontal faces. Further, in detection of faces that are in profile, the face detection software may be configured to determine whether the face in profile is facing left or right.

Each frontal face may be analyzed to locate facial features within the detected face (e.g. the locations of 88 points on a standard face which identify the edge of the face and the locations of the eyes, eyebrows, nose, mouth, etc.). In one illustrative embodiment, three of these 88 points may be used to determine the face direction and/or estimate the angle at which the face is directed. For example, in one illustrative embodiment, the center of the nose point, N, and the points, L and R, on either side of the face, located at the same level as the nose, and in a line parallel to the line of the eyes, may be used to determine the face direction and/or estimate the angle at which the face is directed. These three points (L, N, and R) may be approximately in a straight line.

in this embodiment, if distance (L,N)>distance(R,N), then the face of the subject is facing or angled to the right of the image. Similarly, if distance(L,N)<distance(R,N), then the face of the subject is facing or angled to the left of the image. The significance of the angle of the face (face direction) may be estimated by a certainty factor, $CF_{fd}$, as follows:

$$CF_{fd}=(2*\max(\text{distance}(L,N),\text{distance}(R,N))-\text{distance}(L,R))/\text{distance}(L,R)$$

The value of the angle at which the face is directed may, for example, vary from 0.0 when the nose point, N, is midway between L and R, to 1.0 when the nose point is coincident with the face edge point L or R. Thus, completely profile faces may be immediately categorized as facing either right or left with a certainty of 1.0.

In the case of a single face in an image the metadata concerning the relative position of the face may be derived directly from $CF_{fd}$ by weighting its value with the size of the face in the image. For example, larger faces may increase the significance of the metadata, and subsequently increase the significance of the position of the image in a composition template (FIG. 1, 100). Likewise, small faces may decrease the significance of the metadata, and subsequently decrease the significance of the position of the image in a composition template (FIG. 1, 100). In one illustrative embodiment, for a face angled towards the right of the image, the recommended image position may be to position the image towards the left of the compilation template (FIG. 1, 100). Similarly, for a face angled towards the left of the image, the recommended image position may be to position the image towards the right of the compilation template (FIG. 1, 100).

In the case of multiple faces in an image, the sum of size weighted face direction certainties is formed for the faces looking in each direction. The larger of the two sums may denote the recommended position for the image (left or right) of the compilation template (FIG. 1, 100). The difference in magnitude of the sums may denote the strength of the recommended position within the compilation template (FIG. 1, 100).

hi one illustrative embodiment, the metadata for each image is made available to the image arranging unit (FIG. 2, 240) for application to a compilation template (FIG. 1, 100). The image arranging unit (FIG. 2, 240) may be configured to automatically arrange the images or configure the template based on the metadata and user preferences. In another embodiment, the image arranging unit (FIG. 2, 240) may be configured to provide to a user recommendations as to where the various images should be place within the compilation template (FIG. 1, 100) based on the metadata and user preferences.

In some cases, the metadata may suggest mutually incompatible image placements within the compilation template (FIG. 1, 100) and further processing may be carried out to resolve the conflict. This further processing may operate in two stages. First, the imaging placements are checked for mutual compatibility and any conflicts are identified. Second, any identified conflicts are resolved.

In one embodiment, the conflict may be resolved by disregarding metadata from all the images but the image containing the metadata with the highest strength. In another embodiment, the conflict may be so resolved by taking into account the relative sizes of the images on the compilation template (FIG. 1, 100). In this illustrative embodiment, the present system would first resolve the conflicting sizes of the images, and then resolve other conflicts, weighting the individual image metadata strengths by the relative size of each image on the compilation template (FIG. 1, 100).

In still another illustrative embodiment, the strongest metadata may be determined by the certainty of a metadata feature, the relative importance of the metadata feature, the relative size of the image, and combinations thereof. In this illustrative embodiment, some metadata may have an associated certainty factor which influences their importance when resolving conflicts. For example, a combination of the degree of face direction turn and the size of the face in the image may qualify an image as an image of relatively higher importance. Also, some metadata features may intrinsically be given more weight than others. For example, placement of an image based on face direction may override placement of an image based on colors in the image. These metadata considerations may be combined with relative image size on the page to determine a more aesthetically pleasing arrangement of images on a page.

In yet another illustrative embodiment, recommendations as to which sets of images (e.g. compilations) may be arranged in connection with other compilations may also be provided. In this embodiment, the individual images of the two or more compositions may be chosen based on the above factors, and may be arranged in such a way in their individual compositions so as to bring about an overall aesthetically pleasing look with respect to the other compositions. For example, if a user desired to create an album of compilations, wherein several compilations are collected in a book or other collection, then the present system and method may provide recommendations as to the best overall aesthetically pleasing layout for the number of compilations.

Therefore, a system and method for deriving metadata from a number of images representing content of the images, and arranging the images within a compilation based on the metadata is disclosed. More specifically, metadata representing various aesthetic factors of the images are derived. The present system and method then allows a user to manually or automatically arrange the images to create a compilation of images that are aesthetically pleasing. The present system and method provides for a means for a user to quickly and conveniently prepare a compilation of images without the cost of hiring a professional designer. Further, the present system and method provides for a means for a user to quickly and conveniently prepare a compilation of images via a webpage embodied on a server that is external to the present system. Thus a user may upload, store, edit, and enhance the digital images via the webpage, as well as arranging the images within a compilation. Therefore, the present system and method may provide a more cost effective means of producing a printed copy of a compilation of images from a user's personal computer without having to purchase separate computing devices, software, etc.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for arranging a number of images into a compilation of images comprising:
    deriving metadata from the images based on the content of the images;
    automatically determining a gaze direction for a plurality of faces within an image based on a weighted combination of strengths of individual face directionalities and the relative sizes of the individual faces using a face feature detection technique; and
    using the gaze direction as metadata for arranging images.

2. The method according to claim 1, in which derivation of the metadata comprises at least one of: a color segmentation technique, a face detection technique, face feature detection technique, and combinations thereof.

3. The method according to claim 1, further comprising providing recommendations for arranging images to a user based on the metadata derived from the images.

4. The method according to claim 1, further comprising: determining incompatibility of images placements, and resolving conflicts between incompatible images.

5. The method according to claim 4, in which resolving conflicts between incompatible images comprises disregarding metadata derived from a number of images except the image containing metadata with a highest strength.

6. The method according to claim 1, further comprising providing recommendations for arranging images to a user based on the metadata derived from the images.

7. A system for arranging a number of images into a compilation of images comprising:
    a metadata derivation unit configured to derive metadata from images based on the content of the images;
    a gaze direction determining unit configured to automatically determine a gaze direction for a plurality of faces within an image based on a weighted combination of strengths of individual face directionalities and the relative sizes of the individual faces using a face feature detection technique; and
    said system using the gaze direction as metadata for arranging images.

* * * * *